United States Patent [19]

Galperin et al.

[11] Patent Number: 5,716,897
[45] Date of Patent: Feb. 10, 1998

[54] SULFUR TOLERANT HYDROCARBON CONVERSION CATALYST

[75] Inventors: Leonid B. Galperin, Wilmette; Robert L. Bedard, McHenry, both of Ill.

[73] Assignee: UOP, Des Plaines, Ill.

[21] Appl. No.: 685,763

[22] Filed: Jul. 24, 1996

[51] Int. Cl.⁶ .................. B01J 23/44; B01J 29/04
[52] U.S. Cl. .............. 502/333; 502/327; 502/213; 502/66
[58] Field of Search ............... 502/66, 327, 329, 502/333, 302, 208, 213

[56] References Cited

U.S. PATENT DOCUMENTS 4,755,498  7/1988  Setzer et al. ................ 502/303

*Primary Examiner*—Glenn Caldarola
*Assistant Examiner*—Bekir L. Yildirim
*Attorney, Agent, or Firm*—Thomas K. McBride; Eugene I. Snyder; Frank S. Molinaro

[57] ABSTRACT

Applicants have developed a catalyst for various hydrocarbon conversion processes which is tolerant to the presence of large mounts of sulfur (1000 ppm) in the feedstream. The catalyst consists of a MeAPSO support that has dispersed thereon palladium and a modifier such as lanthanum or dysprosium.

13 Claims, No Drawings

1

SULFUR TOLERANT HYDROCARBON CONVERSION CATALYST

FIELD OF THE INVENTION

This invention relates to a novel catalyst for various hydrocarbon conversion processes such as hydrogenation, isomerization and cracking. The catalyst comprises a MeAPSO molecular sieve support, having dispersed thereon palladium and a modifier such as lanthanum or dysprosium.

BACKGROUND OF THE INVENTION

It is well known that sulfur adversely affects the activity of hydrocarbon conversion catalysts which contain one or more noble metals. Sulfur directly poisons the noble metal function resulting in low catalyst activity and fast catalyst deactivation. It is for this reason that basic hydrocarbon conversion processes such as platforming, isomerization, hydrogenation-dehydrogenation require that the hydrocarbon stream be pretreated in order to reduce sulfur content down to parts per million or pans per billion levels. The art indicates that a considerable amount of effort has been dedicated to improving the sulfur tolerance of hydrocarbon conversion catalysts. However, the best sulfur tolerant catalysts can only tolerate a few parts per million of sulfur. Therefore, a need exists in the art for a catalyst which can tolerate more than a few parts per million of sulfur in a hydrocarbon feed stream.

Applicants have prepared a sulfur tolerant catalyst which can maintain considerable activity with as much as 1,000 ppm of sulfur in the hydrocarbon feed. The catalyst consists of a MeAPSO molecular sieve support which has dispersed thereon palladium and a modifier such as lanthanum or dysprosium.

In contrast to applicants' catalyst, U.S. Pat. No. 4,755,498 discloses a catalyst containing a noble metal such as iridium, palladium or platinum supported on a lanthanum stabilized alumina. However, the '498 patent discloses only that the catalyst is sulfur tolerant for steam reforming activity. The examples presented in the '498 patent all contain platinum as the noble metal, whereas applicants have discovered that lanthanum does not provide sulfur tolerance for platinum catalysts for hydrocarbon conversion processes such as hydrogenation, isomerization or cracking. Accordingly, there is no expectation based on the '498 patent that lanthanum could render a palladium dispersed on a MeAPSO support catalyst sulfur tolerant.

SUMMARY OF THE INVENTION

This invention relates to a novel sulfur tolerant catalyst which has uses for hydrocarbon conversion processes. One specific embodiment of this invention is a catalytic composite consisting essentially of a molecular sieve support having dispersed thereon palladium and a modifier, and a binder, the support characterized in that it has an empirical formula of: $Me_xAPSO$ where Me is a metal selected from the group consisting of magnesium, manganese, cobalt, iron, zinc, and mixtures thereof, x has a value from greater than zero to about 0.5, the modifier selected from the group consisting of lanthanum, cerium, praseodymium, neodymium, samarium, gadolinium, terbium, dysprosium, and mixtures thereof and the binder is selected from the group consisting of alumina, silica, silica/alumina, and mixtures thereof.

Another embodiment of the invention is a hydrocarbon conversion process comprising contacting a hydrocarbon feed with a catalytic composite at hydrocarbon conversion conditions to give a converted product, the catalytic composite consisting essentially of a molecular sieve support having dispersed thereon palladium and a modifier, and a binder, the support characterized in that it has an empirical formula of: $Me_xAPSO$ where Me is a metal selected from the group consisting of magnesium, manganese, cobalt, iron, zinc, and mixtures thereof, x has a value from greater than zero to about 0.5, the modifier selected from the group consisting of lanthanum, cerium, praseodymium, neodymium, samarium, gadolinium, terbium, dysprosium, and mixtures thereof and the binder is selected from the group consisting of alumina, silica, silica/alumina, and mixtures thereof.

Yet another embodiment is a process for preparing a catalytic composite consisting essentially of a molecular sieve support having dispersed thereon palladium and a modifier, and a binder, the support characterized in that it has an empirical formula of: $Me_xAPSO$ where Me is a metal selected from the group consisting of magnesium, manganese, cobalt, iron, zinc, and mixtures thereof, x has a value from greater than zero to about 0.5, the modifier selected from the group consisting of lanthanum, cerium, praseodymium, neodymium, samarium, gadolinium, terbium, dysprosium, and mixtures thereof and the binder is selected from the group consisting of alumina, silica, silica/ alumina, and mixtures thereof, the process comprising impregnating the support with an aqueous solution containing a palladium compound and a modifier compound, drying the impregnated support at a temperature of about 60° C. to about 300° C. to give a dried catalytic composite and treating the dried catalytic composite at a temperature of about 300° C. to about 500° C. with a $H_2/H_2S$ gas mixture for a time of about 1 to about 10 hours thereby providing the composite.

These and other objects of the invention will become more apparent after a detailed description of the invention.

DETAILED DESCRIPTION OF THE INVENTION

As stated, the instant invention relates to a novel sulfur tolerant catalytic composite. One essential element of the instant composite is a support which is a molecular sieve. The molecular sieve is a $Me_xAPSO$ molecular sieve where x has a value from greater than zero to about 0.5. $Me_xAPSO$ is an acronym for a metal aluminumsilicophosphate molecular sieve where Me is selected from the group consisting of magnesium, manganese, cobalt, iron, zinc, and mixtures thereof. $Me_xAPSOs$ are described in U.S. Pat. No. 4,793,984 which is incorporated by reference. The specific molecular sieves are also described in the following patents: MgAPSO or MAPSO—U.S. Pat. No. 4,758,419. MnAPSO—U.S. Pat. No. 4,686,092; CoAPSO—U.S. Pat. No. 4,744,970; FeAPSO—U.S. Pat. No. 4,683,217 and ZnAPSO U.S. Pat. No. 4,935,216, all of which are incorporated by reference. A preferred MeAPSO support is MAPSO (M=Mg) and a preferred MAPSO is MAPSO-31 where 31 means a MAPSO molecular sieve having structure type 31. This numbering system is also described in the above incorporated patents.

The MeAPSO support can be formed in any desired shape such as pills, cakes, extrudates, powders, granules, etc. and they may be utilized in any particular size. The support is formed into the particular shape by means well known in the art. In making the various shapes, it is necessary to mix the MeAPSO support with a binder. Examples of binders which can be used include but are not limited to alumina, silica, silica/alumina, and mixtures thereof. It should be pointed out that the term silica/alumina does not mean a physical mixture of silica and alumina but means an acidic and amorphous material that has been cogelled or coprecipitated. This term is well known in the art, see e.g., U.S. Pat. Nos. 3,909,450; 3,274,124 and 4,988,659. Usually the molecular sieve and binder are mixed along with a peptizing agent such as HCl, HNO$_3$, KOH, etc. to form a dough. This dough is extruded through a suitably shaped and sized die to form extrudate particles, which are dried and calcined. Calcination is normally carried out at a temperature of about 260° C. to about 650° C. for a period of about 0.5 to about 2 hours. The amount of binder which is present in the composite can vary from about 10 to about 90 wt. % of the composite and preferably from about 30 to about 70 wt. %.

Two other necessary components of the composite of this invention are palladium and a modifier selected from the group consisting of lanthanum, cerium, praseodymium, neodymium, samarium, gadolinum, tertium, dysprosium, and mixtures thereof. It is necessary that the palladium and desired modifier be simultaneously dispersed onto the support. These two components can be dispersed onto the support by means known in the art such as spray impregnation or evaporative impregnation. Both spray or evaporative impregnation use a solution containing decomposable compounds of the two components. By decomposable is meant that upon heating, the compound decomposes to provide the metal or metal oxide. Examples of palladium compounds which can be used in preparing said solution include but are not limited to palladic acid, tetraamine palladium chloride, palladium nitrate, palladium chloride and palladium bromide. Illustrative examples of the decomposable modifier compounds which can be used are the nitrate, chloride, bromide or acetate salts of the modifier metals. Spray impregnation involves taking a small volume of the solution and spraying it over the support while the support is moving. When the spraying is over, the wetted support can be transferred to other apparatus for drying or finishing steps.

One particular method of evaporative impregnation involves the use of a steam-jacketed rotary dryer. In this method the support is immersed in the impregnating solution which has been placed in the dryer and the support is tumbled by the rotating motion of the dryer. Evaporation of the solution in contact with the tumbling support is expedited by applying steam to the dryer jacket. The impregnated support is then dried at a temperature of about 60° C. to about 300° C. Finally, the palladium and modifier metals are fixed onto the support by heating and treating the catalyst to a temperature of about 300° C. to about 500° C. under a H$_2$/H$_2$S gas mixture for a time of about 1 to about 10 hours. The ratio of H$_2$:H$_2$S can vary from about 1000:1 to about 4:1. The amount of palladium dispersed on the support can vary from about 0.1 to about 10 wt. % of the composite and preferably from about 0.5 to about 2.0 wt. %. The amount of modifier present on the composite varies from about 0.1 to about 10 and preferably from about 0.5 to about 3.0 wt. % of the composite. Additionally, the ratio of palladium to modifier should be from about 10:1 to about 1:10, preferably from about 2:1 to about 1:5, with a 1:1 ratio being most preferred.

The catalytic composite of the invention can be used for various hydrocarbon conversion processes including hydrogenation, isomerization, hydroisomerization and cracking. Specific conditions for these reactions are well known in the art and generally depend on the type of hydrocarbon to be converted. In hydroisomerization, feedstocks such as normal paraffins are converted to saturated branch chain isomers. Hydroisomerization is carried out at a temperature from about 90° C. to about 550° C., preferably 150° C. to about 450° C., a pressure of about atmospheric to about 13,790 kPa with a liquid hourly space velocity (LHSV) value of about 0.2 to about 10. Hydrogen is supplied to the reactor in mixture with the hydrocarbon feedstock in molar proportions of H$_2$:hydrocarbons between 1 and 5.

Hydrogenation conditions include pressures of about 0 kPag to about 13,789 kPag, temperatures of about 50° C. to about 280° C., H$_2$ to hydrocarbon ratios of about 1:1 to about 1:1000 and a LHSV of about 0.1 to about 20.

In order to more fully illustrate the invention, the following examples are set forth. It is to be understood that the examples are only by way of illustration and are not intended as an undue limitation on the broad scope of the invention as set forth in the appended claims.

EXAMPLE 1

A MAPSO-31/Al$_2$O$_3$ support was prepared as follows. In a container 909 g of MAPSO-31, 274 g of alumina (obtained from Catapal, Inc.), 489 g of deionized water and 42.9 g of concentrated HNO$_3$ (70 wt. %) were mixed for 45 minutes at room temperature and then extruded through a plate with 15.9 mm (⅟₁₆ inch) holes. The wet extrudates were dried at 100° C. for 24 hours and calcined in air at 600° C. for 3 hours giving a support with 80 wt. % MAPSO-31 and 20 wt. % Al$_2$O$_3$.

EXAMPLE 2

In a container 5.96 g of La (NO$_3$)$_3$•6H$_2$O were dissolved in 145 g of deionized water and to it there were added 4.9 g of a PdCl$_2$ solution (19.8 wt. % Pd). The solution was now transferred to a rotary evaporator equipped with a steam jacket. To the solution there were added 94.2 g of the extrudates prepared in Example 1. The mixture was rolled for 1 hour at room temperature and then for 2 hours with steam. The impregnated catalyst was then dried at 150° C. for 4 hours and then reduced using a H$_2$/H$_2$S (90/10) mixture at 415° C. for 4 hours. The catalyst was cooled under nitrogen and unloaded under nitrogen. Elemental analysis showed that the catalyst contained 1% Pd and 1.97% La. This catalyst was identified as catalyst A.

EXAMPLE 3

In a rotary evaporator there were placed 5.96 g of La(NO$_3$)$_3$•6H$_2$O and 150 g of deionized water. To this solution there were added 94.2 of a MAPSO-31 support (80% MAPSO-31 and 20% alumina prepared as described in Example 1) and the mixture rolled at room temperature for 1 hour, followed by rolling for 2 hours with steam. The impregnated support was dried at 150° C. for 4 hours and then calcined in air for 4 hours at 400° C.

Next 4.9 g of PdCl$_2$ (19.8% Pd) was added to 150 g of deionized water and the solution placed into a rotary evaporator. The La containing support was added to the solution and the mixture was rolled for 1 hour at room temperature and then rolled for 4 hours with steam. The impregnated catalyst was dried at 150° C. for 4 hours and then reduced as in Example 1. Analysis of this catalyst showed that it contained 1.02% Pd and 2.02% La. This catalyst was identified as catalyst B.

EXAMPLE 4

A catalyst was prepared as in Example 2 except that the palladium was impregnated first, calcined and then the lanthanum was impregnated followed by a reduction step. This catalyst was identified as catalyst C and was found to contain 1.01 % Pd and 2.11% La.

EXAMPLE 5

A palladium only catalyst was prepared by adding 6.41 g of $PdCl_2$ solution (19.8 wt. % Pd) to 200 g of deionized water in a rotary evaporator equipped with a steam jacket. To this solution there were added 125.6 g of a MAPSO-31/ $Al_2O_3$ support prepared per Example 1 and the mixture rolled for 1 hour at room temperature and then rolled 2 hours with steam. The impregnated support was dried in an oven for 4 hours at 120° C. and then reduced using a $H_2/H_2S$ (90/10)mixture at 415° C. for 4 hours. Elemental analysis showed that the catalyst contained 1.02% Pd. This catalyst was identified as catalyst D.

EXAMPLE 6

A Pd/Dy catalyst was prepared using the procedure of Example 2 except that the following compounds were used: 2.02 g of $PdCl_2$ solution (19.8 wt. % Pd); 2.43 g of $Dy(NO_3)_3 \cdot 5H_2O$; 100 g of deionized water and 40 g of 80% MAPSO-31/20% of $Al_2O_3$ as per Example 1. Elemental analysis showed that the catalyst contained 1.06% Pd and 1.96% Dy. This catalyst was identified as catalyst E.

EXAMPLE 8

A Pd/Ce catalyst was prepared using the procedure of Example 2 except that the following compounds were used: 3.14 g of a $PdCl_2$ solution (19.8 wt. %); 1.93 g of $Ce(NO_3)_3 \cdot 6H_2O$; 120 g of deionized water and 63.4 g of 80% of MAPSO-31/20% $Al_2O_3$ support prepared per Example 1. Elemental analysis showed that the catalyst contained 1.06% Pd and 0.9% Ce. This catalyst was identified as catalyst F.

EXAMPLE 9

A Pd/Pr catalyst was prepared using the procedure of Example 2 except that the following compounds were used: 2.3 g of a $PdCl_2$ solution (19.8 wt. %); 1.89 g of $Pr(NO_3)_3 \cdot 6H_2O$; 100 g of deionized water and 46.5 g of 80% MAPSO-31/20% $Al_2O_3$ support prepared per Example 1. Elemental analysis showed that the catalyst contained 1.02% Pd and 1.3% Pr. This catalyst was identified as catalyst G.

EXAMPLE 10

A Pd/La/Pr catalyst was prepared using the procedure of Example 2 except that the following compounds were used: 3.17 g of a $PdCl_2$ solution (19.8 wt. %); 3.85 g of $La(NO_3)_3 \cdot 6H_2O$; 0.968 g of $Pr(NO_3)_3 \cdot 6H_2O$; 20 g of deionized water and 64 g of 80% MAPSO-31/20% $Al_2O_3$ support prepared per Example 1. Elemental analysis showed that the catalyst contained 1.0% Pd, 1.97% La and 0.5% Pr. This catalyst was identified as catalyst H.

EXAMPLE 11

The catalysts described above were tested for C-10 hydroisomerization as follows. A 5 g sample of each catalyst that had been crushed to 40–60 mesh was mixed with an equal volume of sand and the mixture loaded into a steel reactor under nitrogen. A feed containing $n-C_{10}$ plus hydrogen at a ratio of $H_2$/hydrocarbon of 1000 SCFB and 1000 ppm $H_2S$ in hydrogen was downflowed through the catalyst at a LHSV of 25 g/hr and a pressure of 3448 kPag (500 psig). The reactor was ramped up to a certain temperature and lined out at that temperature for 3 hours. At that point the effluent was analyzed by gas chromatography to determine the percent of $N-C_{10}$ converted, i.e., disappearance of $n-C_{10}$ and the selectivity to $i-C_{10}$. Any component having a carbon number less than 10 is a cracked component and undesirable. The results of this test are presented in the Table. What is presented is selectivity at 50% conversion. Selectivity was stable (±2.5%) within the conversion range of 10–80%.

Effect of Rare Earth Stabilizer on Hydroisomerization Activity

| Catalyst I.D. | $i-C_{10}$ Selectivity (%) |
| --- | --- |
| A (Pd/La Co-Imp.) | 62 |
| B (Pd/La La first) | 44 |
| C (Pd/La Pd first) | 35 |
| D (Pd Only) | 42 |
| E (Pd/Dy) | 60 |
| F (Pd/Ce) | 56 |
| G (Pd/Pr) | 50 |
| H (Pd/La/Pr) | 60 |

We claim as our invention:

1. A sulfur tolerant catalytic composite consisting essentially of a molecular sieve support having dispersed thereon palladium and a modifier, and a binder, the support characterized in that it has an empirical formula of: $Me_xAPSO$ where Me is a metal selected from the group consisting of magnesium, manganese, cobalt, iron, zinc, and mixtures thereof, x has a value from greater than zero to about 0.5, the modifier selected from the group consisting of lanthanum, cerium, praseodymium, neodymium, samarium, gadolinium, terbium, and mixtures thereof and the binder is selected from the group consisting of alumina, silica, silica/alumina, and mixtures thereof.

2. The composite of claim 1 where the binder is present in an amount from about 10 to about 90 wt. % of the composite.

3. The composite of claim 1 where the modifier is selected from the group consisting of lanthanum, praseodymium, and mixtures thereof.

4. The composite of claim 1 where the modifier is present in an amount from about 0.1 to about 10 wt. % of the composite.

5. The composite of claim 1 where the palladium is present in an amount from about 0.1 to about 10 wt. % of the composite.

6. The composite of claim 1 where the palladium and modifier are present in a 1:1 ratio.

7. The composite of claim 1 where the binder is alumina.

8. The composite of claim 1 where Me is magnesium.

9. The composite of claim 1 where the composite is formed in the shape of pills, extradates, and granules.

10. A process for preparing a sulfur tolerant catalytic composite consisting essentially of a molecular sieve support having dispersed thereon palladium and a modifier, and a binder, the support characterized in that it has an empirical formula of: $Me_xAPSO$ where Me is a metal selected from the group consisting of magnesium, manganese, cobalt, iron, zinc, and mixtures thereof, x has a value from greater than zero to about 0.5, the modifier selected from the group consisting of lanthanum, cerium, praseodymium, neodymium, samarium, gadolinium, terbium, and mixtures thereof and the binder is selected from the group consisting of alumina, silica, silica/alumina, and mixtures thereof, the process comprising impregnating the support with an aqueous solution containing a palladium compound and a modifier compound, drying the impregnated support at a temperature of about 60° C. to about 300° C. to give a dried catalytic composite and treating the dried catalytic composite at a temperature of about 300° C. to about 500° C. with a $H_2/H_2S$ gas mixture for a time of about 1 to about 10 hours thereby providing said composite.

11. The process of claim 10 where the ratio of $H_2:H_2S$ varies from about 1000:1 to about 4:1.

12. The process of claim 10 where the palladium compound is selected from the group consisting of palladic acid, tetraamine palladium chloride, palladium nitrate, palladium chloride and palladium bromide.

13. The process of claim 10 where the modifier compound is selected from the group consisting of the nitrate, chloride, bromide and acetate salt of said modifier.

* * * * *